(12) United States Patent
Hickey et al.

(10) Patent No.: US 8,255,674 B2
(45) Date of Patent: Aug. 28, 2012

(54) IMPLIED STORAGE OPERATION DECODE USING REDUNDANT TARGET ADDRESS DETECTION

(75) Inventors: Mark Joseph Hickey, Rochester, MN (US); Adam James Muff, Rochester, MN (US); Matthew Ray Tubbs, Rochester, MN (US); Charles David Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 12/360,975

(22) Filed: Jan. 28, 2009

(65) Prior Publication Data

US 2010/0191937 A1  Jul. 29, 2010

(51) Int. Cl.
*G06F 9/312* (2006.01)
(52) U.S. Cl. ........................... 712/226; 712/208
(58) Field of Classification Search .................. None
See application file for complete search history.

(56) References Cited

U.S. PATENT DOCUMENTS

| | | | | |
|---|---|---|---|---|
| 6,470,445 | B1 * | 10/2002 | Arnold et al. | 712/218 |
| 6,857,060 | B2 * | 2/2005 | Elias et al. | 712/217 |
| 7,730,285 | B1 * | 6/2010 | Chen et al. | 712/218 |
| 7,831,804 | B2 * | 11/2010 | Pappalardo et al. | 712/20 |
| 2002/0087839 | A1 * | 7/2002 | Jarvis et al. | 712/218 |
| 2003/0033506 | A1 * | 2/2003 | Hinds et al. | 712/217 |
| 2004/0078791 | A1 * | 4/2004 | Metzger | 717/161 |
| 2006/0112258 | A1 * | 5/2006 | Yang et al. | 712/10 |

OTHER PUBLICATIONS

Hinton, G. etal., A 0.18-um CMOS IA-32 Processor with a 4-GHZ Integer Execution unit, Nov. 2001, IEEE Journal of Solid State Circuits, vol. 36, No. 11, pp. 1617-1627.*
Chaitin G.J. , Register Allocation & Spilling via Graph Coloring, 1982, ACM, pp. 98.*
Pereira, Fernando M.Q., A Survey of Register Allocation, Oct. 12, 2008.*
Muchnick, Steven S., Advanced Compiler Design Implementation, 1997, Academic press, pp. 506-509.*
Govindarajan, R., etal., Minimum Register Instruction Sequencing to Reduce Register Spills in Out-of-Order Issue Superscalar Architectures, 2003 IEEE, p. 4.*

* cited by examiner

Primary Examiner — Eric Coleman
(74) Attorney, Agent, or Firm — Robert R. Williams (57) ABSTRACT

A logic arrangement and method to support implied storage operation decode uses redundant target address detection, whereby target addresses of previous instructions are compared with the target address of the current instruction, and if equal, and the target addresses of previous instructions are not used as sources, the current instruction is decoded as a store instruction. This allows a redundant operation in an instruction set architecture to be redefined as a store instruction, freeing up opcodes normally used for store instructions to be used for other instructions.

20 Claims, 6 Drawing Sheets

IMPLIED STORAGE OPERATION DECODE USING REDUNDANT TARGET ADDRESS DETECTION

FIELD OF THE INVENTION

The invention is generally related to data processing, and in particular to processor architectures and execution units incorporated therein.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an opcode that identifies the type of instruction, as well as one or more operands that identify input and/or output data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases. Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by utilizing redundant target address detection logic to override the decoding of an instruction that would normally write to an entry in a register file redundantly, and instead interpret the instruction as a storage operation.

Therefore, consistent with one aspect of the invention, a logic arrangement includes a register file including a plurality of registers configured to store operand data, and execution logic configured to execute instructions from an instruction stream. The register file is configured to provide operand data associated with an address to the execution unit in response to receiving a source address, and is also configured to store data at a particular location in the register file associated with an address in response to receiving a target address. The logic arrangement also includes redundant target address detection logic coupled to the register file and the execution logic, and is configured to detect a condition where an instruction will write data into the register file at the same location that a previous instruction wrote into the register file, without any instruction having first read data out of the same location in the register file. The redundant target address detection logic is further configured to indicate to the execution logic that a redundant write condition has occurred. Further, the execution logic is configured to decode the current instruction as a store instruction in response to receiving an indication that a redundant target write condition has occurred.

Consistent with another aspect of the invention, a method is provided for executing instructions in a processor, where, in response to receiving a first instruction that stores data in a register file using a target address, the target address is stored for later retrieval. In response to executing a second instruction of the type that writes operand data into the register file using a target address, the target addresses of the first and second instructions are compared. In addition, the target address of the first instruction is compared with all source addresses of the second instruction. If the target addresses of the first and second instructions are equal, and none of the source addresses in the second instruction are equal to the target address of the first instruction, the second instruction is interpreted as a store type instruction.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION

Embodiments consistent with the invention identify instructions that would normally redundantly overwrite the same entry in a register file without having used the data at that entry first, and decode those instructions as store instructions. This allows opcodes that would normally be dedicated to store instructions be assigned to other instruction types.

Due to the ever expanding number of registers and new instructions in modern microprocessor cores, the address widths present in an instruction encoding continue to widen, and fewer instruction opcodes are available, making it more difficult to add new instructions to existing architectures without resorting to inelegant tricks that have drawbacks such as source destructive operations. The hereinafter described embodiments therefore allow for much greater opcode space in fixed instruction width architectures by decoding all redundant target write instructions as store instructions, thereby freeing up more opcodes to be used for other instruction types.

Other modifications will become apparent to one of ordinary skill in the art having the benefit of the instant disclosure.

Hardware and Software Environment

Figure 1:
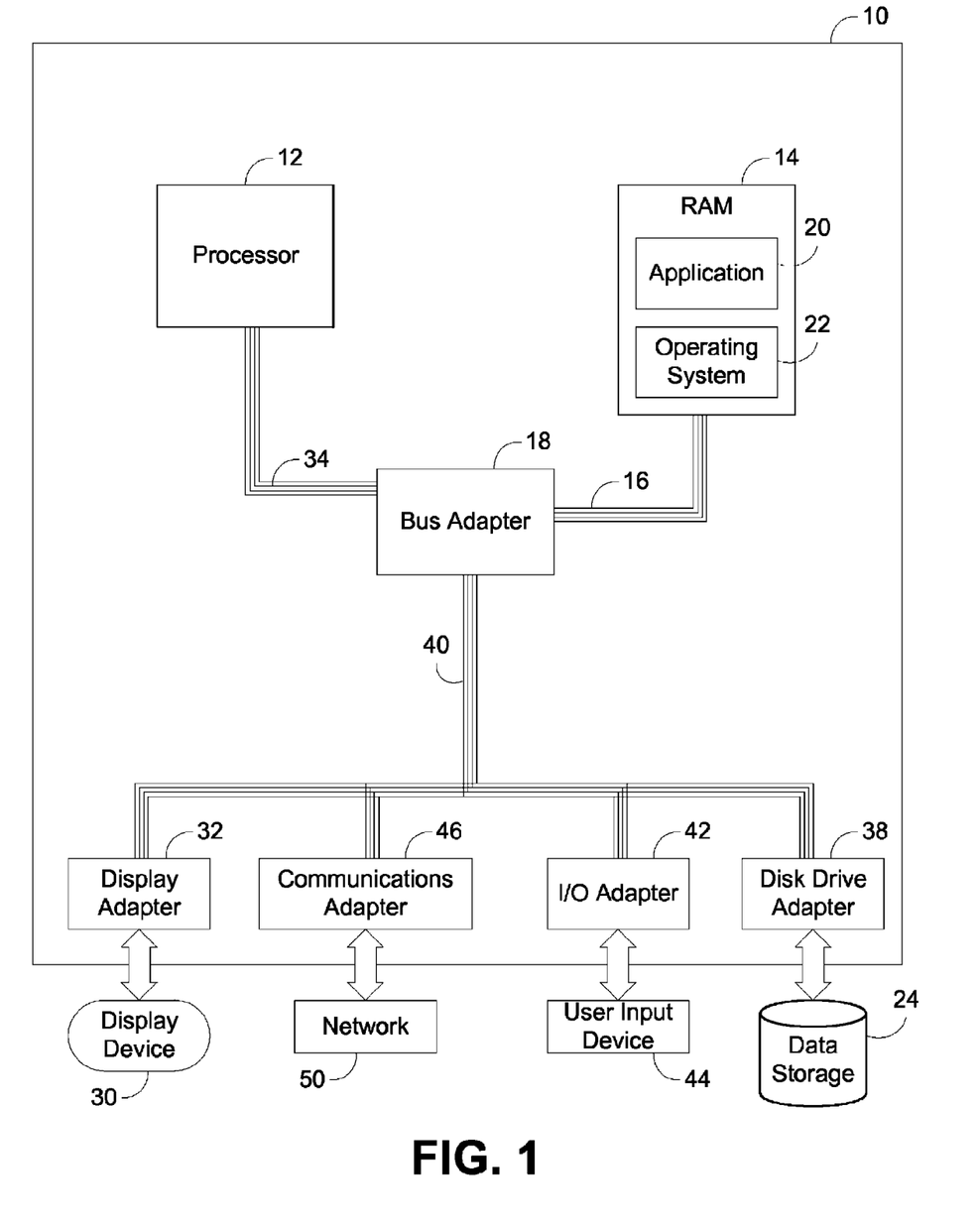
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as a random access memory 14 ('RAM'), which is connected through a high speed memory bus 16 and a bus adapter 18 to processor 12 through a processor bus 34.

Stored in RAM 14 is an application 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on data storage such as a disk drive 24.

Computer 10 of FIG. 1 includes a disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling input and output to and from from user input devices 44 such as keyboards and mice. In addition, computer 10 includes a communications adapter 46 for data communications with a data communications network 50. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications. Computer 10 also includes display adapter 32 which facilitates data communication between bus adapter 18 and display device 30, allowing application 20 to visually present output on display device 30.

Figure 2:
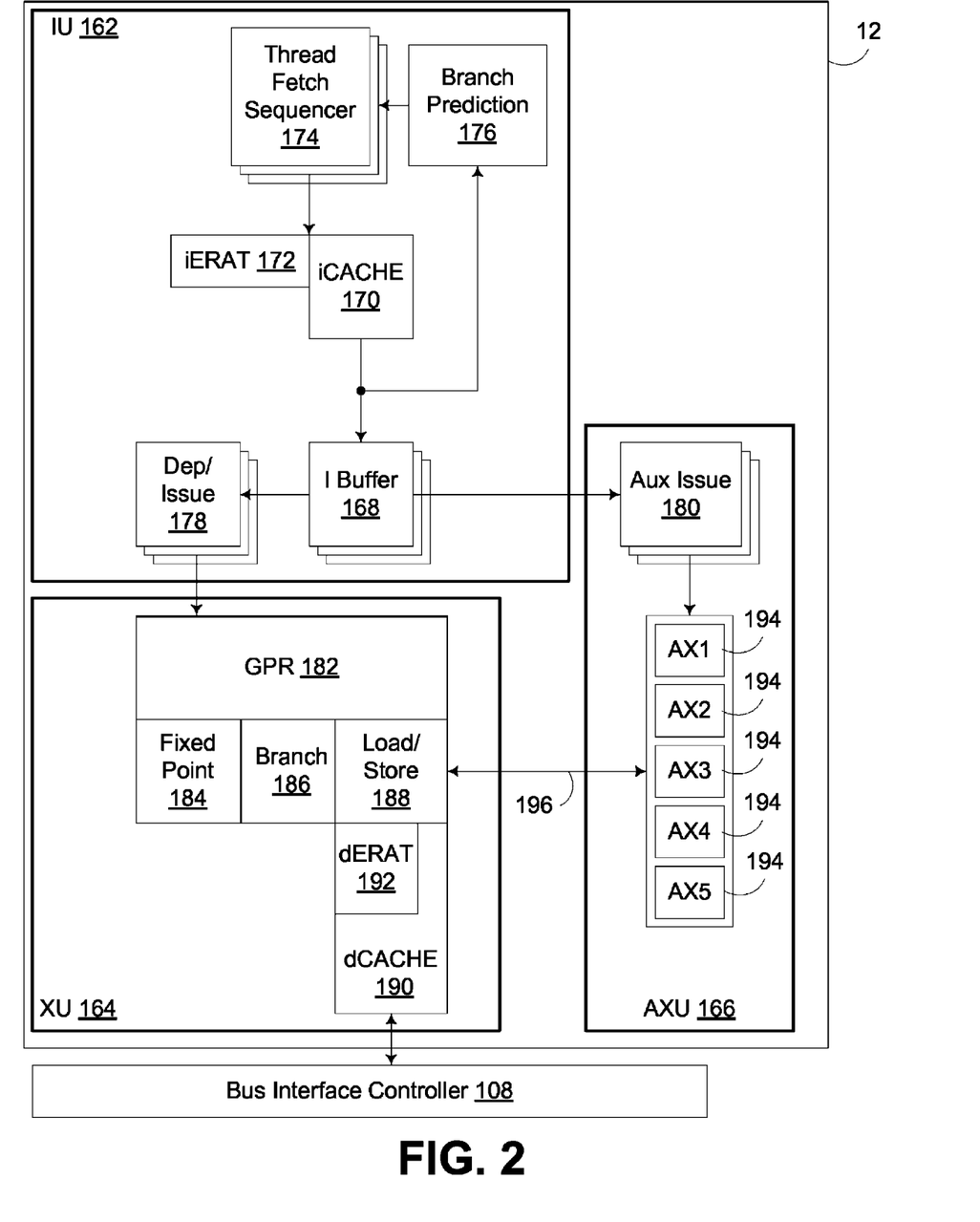
FIG. 2 is a block diagram illustrating in greater detail an exemplary implementation of the processor in FIG. 1.

FIG. 2 next illustrates in another manner one exemplary implementation of a processor 12 consistent with the invention, implemented as a processing element partitioned into an instruction unit (IU) 162, an execution unit (XU) 164 and an auxiliary execution unit (AXU) 166. In the illustrated implementation, IU 162 includes a plurality of instruction buffers 1 68 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory, through bus interface controller 108. Each thread fetch sequencer 174 is dedicated to a particular hardware thread, and is used to ensure that instructions to be executed by the associated thread is fetched into the iCACHE for dispatch to the appropriate execution unit. As also shown in FIG. 2, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate auxiliary instruction dependency/issue logic 180 is provided in AXU 166, thus enabling separate instructions to be concurrently issued by different threads to XU 164 and AXU 166. In an alternative embodiment, auxiliary instruction dependency/issue logic 180 may be disposed in IU 162, or may be omitted in its entirety, such that dependency/issue logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including auxiliary instruction dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a load/store interface 196 to XU 164, e.g., to support load and store instructions in AXU 166.

Figure 3:
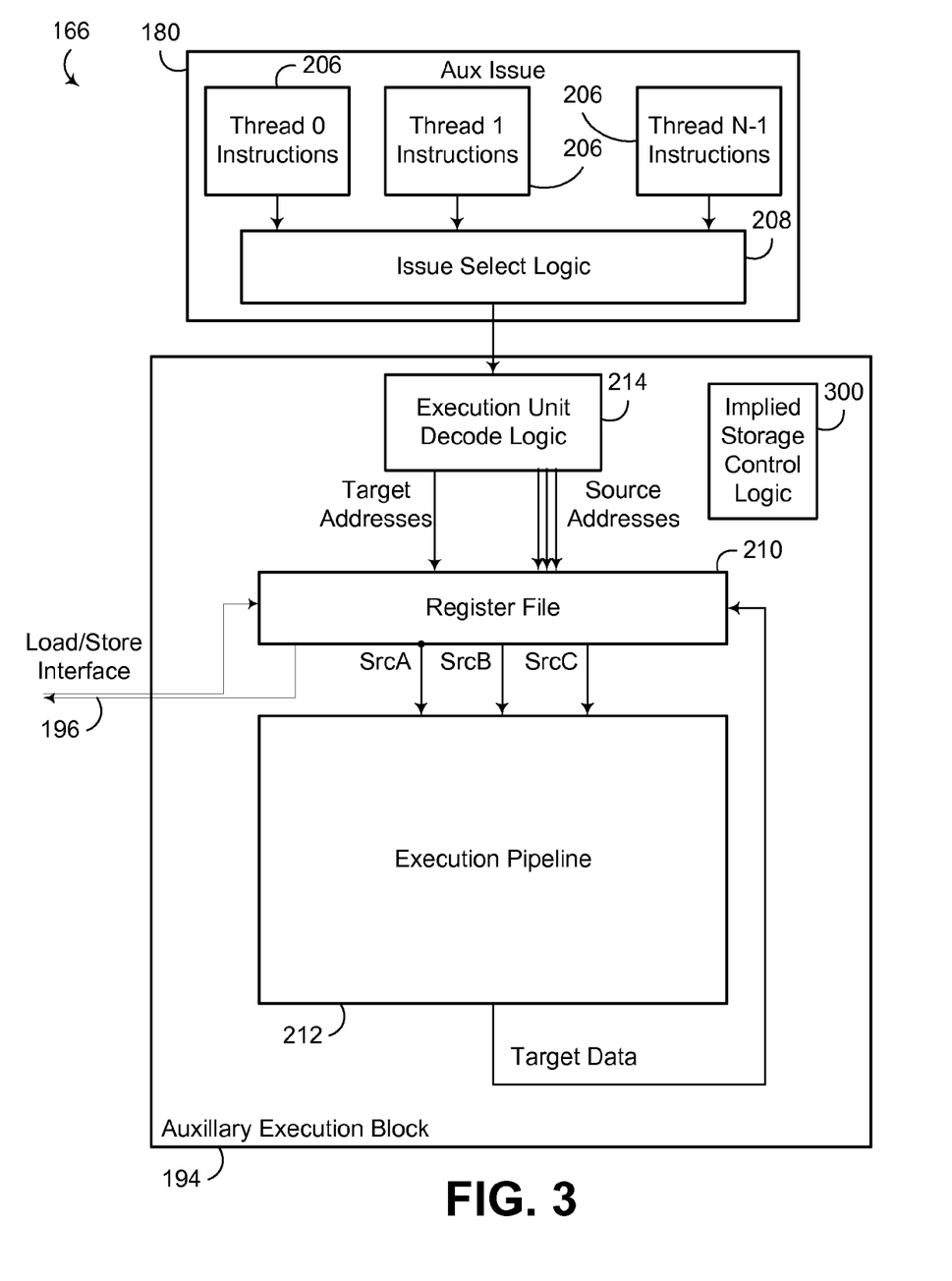
FIG. 3 is a block diagram illustrating an exemplary implementation of an AXU Auxiliary Execution Unit from the processor of FIG. 2.

FIG. 3 illustrates in further detail an exemplary AXU 166 suitable for implementation inside of processor 12 in FIG. 2. AXU 166 is configured with auxiliary instruction dependency/issue logic 180, which is configured to select fair issuance of instructions from multiple threads 206 using an issue select logic 208, which in turn issues instructions from the selected thread to an execution unit decode logic 214 contained in auxiliary execution block 194. Alternatively, other embodiments may be implemented in a single threaded design, where only a single thread is issued to decode logic 214. Execution unit decode logic 214 is configured to obtain target and source addresses from the instruction and provide them to register file 210. Register file 210 is configured to write target data from executed instructions from execution pipeline 212 into a register file entry associated with the target address provided by decode logic 214. Register file 210 is partitioned by thread such that one thread may not read to or write from a partition of another thread. Implied storage control logic 300 is configured to detect a redundant target address write condition separately for each thread, and provide an indication to execution unit decode logic 214 that the current instruction should be decoded as a store instruction. Register file 210 is further configured to read source data (denoted as SrcA, SrcB, SrcC in FIG. 3) from register file entries associated with the source addresses provided by decode logic 214, and provide the source data to execution pipeline 212 for use in execution of the instruction.

Figure 4:
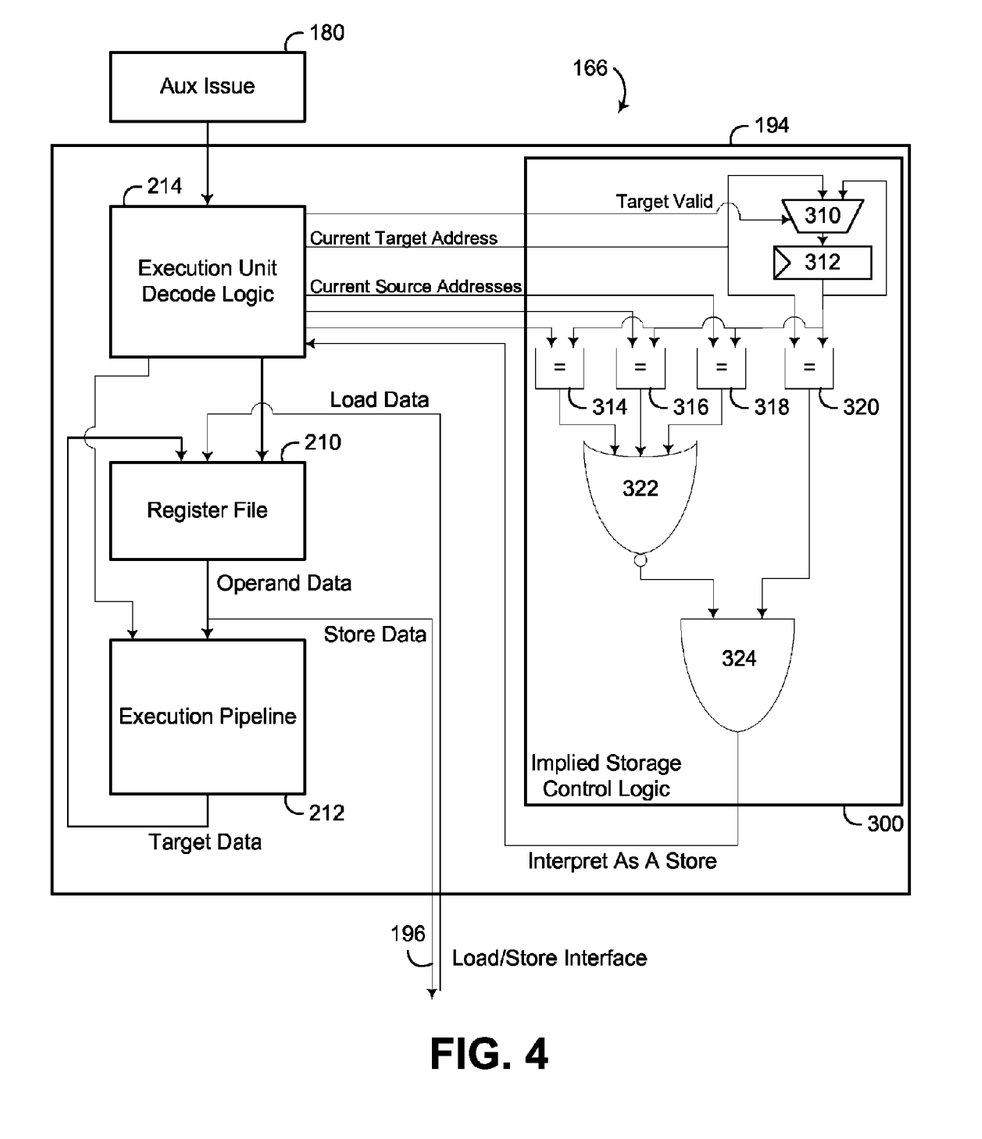
FIG. 4 is a block diagram of a AXU Auxiliary Execution Unit incorporating implied storage operation decode using redundant target address detection consistent with one embodiment of the invention, and capable of being implemented within the processor of FIG. 2.

Implied Storage Operation Decode Using Redundant Target Address Detection in an Execution Unit Turning now to FIG. 4, this figure illustrates additional detail of an auxiliary processing unit 166 capable of performing implied storage operation decode using redundant target address detection. Auxiliary execution unit 166 includes an auxiliary instruction dependency/issue logic 180 coupled to execution unit decode logic 214. In the alternative, auxiliary execution unit 166 may be implemented in other processor architectures that issue and execute instructions, including single or multi-core microprocessors or microcontrollers.

Auxiliary instruction dependency/issue logic 180 operates to schedule the issuance of instructions by the various threads, and auxiliary instruction dependency/issue logic 180 typically includes logic for managing dependencies between instructions, in a manner generally understood in the art. Auxiliary instruction dependency/issue logic 180 outputs instructions to execution unit decode logic 214, which causes auxiliary execution unit 166 to initiate execution of received instructions.

Execution unit decode logic 214 receives instructions from auxiliary instruction dependency/issue 180, and decodes the current instruction type, and if the current instruction is of a first instruction type that writes data into register file 210, provides a target address, and a target write valid to implied storage control logic 300. Execution unit decode logic 214 may be configured to decode a target write valid for all instructions sent to auxiliary execution unit 166, or only for a subset of instruction types based upon the instruction opcode. Implied storage control logic 300 is configured to receive the target address associated with the current instruction and provide it as an input to multiplexer 310. Implied storage control logic 300 is also configured to receive the target write valid and provide it as a selector input to multiplexer 310. Multiplexer 310 is coupled to latch 312 and is configured to provide as input to latch 312 either the output of latch 312 if the target write valid is not asserted, or the current target address from execution unit decode logic 214 if the target write valid is asserted. This configuration allows latch 312 to contain the target address of the last instruction that wrote data into register file 210.

The current target address of the current instruction from execution unit decode logic 214 is also provided to address comparator 320. In addition, the last target address from latch 312 is provided to address comparator 320. Address comparator 320 is configured to compare the addresses from latch 312 and execution unit decode logic 214 and provide an indication to AND gate 324 as to whether or not the target address of the current instruction and the target address from the previous instruction that wrote data into register file 210 are equal. Address comparator 320 compares addresses that comprise an address valid bit, such that address comparator 320 only provides an equal indication if both addresses being compared are valid. An example of an invalid target address would be an instruction that is valid but does not write a target value into the register file.

The target address from latch 312 is also provided to address comparators 314, 316, and 318. The source addresses from the current instruction are sent from execution unit decode logic 214 to address comparators 314, 316 and 318. A separate address comparator configured similarly to 314, 316 and 318 must be included in implied storage control logic 300 for each source address supported by the instruction set architecture. Indications from each address comparator 314, 316 and 318 are provided to NOR gate 322. Address comparators 314, 316 and 318 each compare addresses that comprise an address valid bit in each address, such that address comparators 314, 316 and 318 independently provide an equal indication if both addresses being compared by an address comparator are valid. An example of an invalid source address would be an instruction that is valid but does not use one or several sources in the execution of the instruction.

Address comparators 314, 316 and 318 and NOR gate 322 are configured to detect if none of the source addresses in the current instruction utilize the same target as the last instruction that wrote data into register file 210, meaning that the current instruction does not make use of the data in register file 210 at the address specified in latch 312.

NOR gate 322 then provides an indication to AND gate 324 as to whether or not any source addresses from the current instruction are equal to the last target address used to write data into register file 210. AND gate 324 is configured to accept indications from NOR gate 322 and address comparator 320, and provide an indication to execution unit decode logic 214 that a redundant target address write condition has occurred, and that execution unit decode logic 214 should decode the current instruction as a store instruction.

It will be appreciated by those skilled in the relevant art that any logical equivalent combination of NOR gate 322 and AND gate 324 may be substituted and not depart from the scope of the invention. It should also be noted that a separate implied storage control logic 300 must be implemented for each thread in a multithreaded design.

Auxiliary execution unit 166 includes register file 210 coupled to execution pipeline 212. Register file 210 includes an array of registers, each of which are accessed by a unique address. For example, register file 210 may be implemented to support 64 registers, each accessed by a unique 6 bit address. It will be appreciated that different numbers of registers may be supported in different embodiments.

Execution unit decode logic 214, in response to receiving an indication from implied storage control logic 300 that the current instruction should be decoded as a store instruction, provides the target address of the current instruction to register file 210 to be used to read data out of register file 210. Register file 210 reads store data from the location specified by the target address from execution unit decode logic 214 and provides it to load/store bus 196. In addition, execution unit decode logic 214, in response to receiving an indication from implied storage control logic 300 that the current instruction should be decoded as a store instruction, provides source register addresses to load/store interface 196 to be used by Load/Store logic 188 to calculate the effective address for the store instruction.

Execution unit decode logic 214, in response to receiving an indication from implied storage control logic 300 that the current instruction should not be decoded as a store instruction because no redundant target write condition has occurred, provides source register addresses from the current instruction.

Register file 210, in response to receiving source register addresses from execution unit decode logic 214, will read operand data contained in the register file entries associated with the source register addresses and provide the required operand data to the execution pipeline 212.

Execution pipeline 212, in response to operand data received from register file 210, performs mathematical, logical or other operations on one or more source operands retrieved from selected registers in register file 210. For example, execution pipeline 212 receives a source operand from register file 210, and may store a result data back into register file 210, e.g., in the form of a target written to a register in the register file associated with the target address from execution unit decode logic 214.

Execution pipeline 212 may be implemented as a number of different types of execution units, e.g., floating point units, fixed point units, or specialized execution units such as graphics processing units, encryption/decryption units, coprocessors, XML processing units, etc.

To further illustrate implied storage operation decode using redundant target address detection, a conventional code sequence featuring an explicit storage operation is shown in Table I using Power™ Architecture VMX™ instructions. Instruction a is a vector add instruction that adds the contents of vector registers 2 and 3, and places the result in vector register 1. Instruction b is a vector store instruction, which stores the contents of vector register 1 to the memory address specified by the sum of the contents of general purpose registers 5 and 6. Both instructions a and b occupy their own unique opcode, which occupies valuable opcode space.

TABLE I

Conventional Code Sequence Featuring Explicit Storage Operation

| a: | vaddfp | v1, v2, v3 | # v1=v2+v3 |
|---|---|---|---|
| b: | stvx | v1, r5, r6 | # store contents of v1 |
| | | | #  to address r5+r6 |

Table II shows a code sequence that utilizes an implementation of implied storage operation decode using redundant target address detection consistent with the invention. Instruction a is identical to instruction a in table I, where the contents of vector registers 2 and 3 are added and placed in vector register 1. Instruction b uses the same opcode as instruction a, and also uses what would be the same target address, while not using it as a source, such that instruction b is reinterpreted as a store instruction, while not having to occupy additional opcode space.

TABLE II

Implied Storage Operation Decode Using Redundant Target Address Detection Example Code

| a: | vaddfp | v1, v2, v3 | # v1=v2+v3 |
|---|---|---|---|
| b: | vaddfp | v1, v5, v6 | # reinterpreted as: store contents |
| | | | #  of v1 to address r5+r6 |

Table III presents a pitfall associated with the embodiment described in FIG. 4. Instruction a adds the contents of vector registers 2 and 3 and places the result in vector register 1.

Instruction b also has vector register 1 as a target address, without using it for a source, so it is reinterpreted as a store. The written intent of the code is then to add the contents of vector register 5 and vector register 6 and place the result in register 1. However, since instruction c also uses vector register 1 as a target but not as a source, instruction c is also reinterpreted as a store. This differs from the programmer's intent, such that vector register 1 will not have the expected contents.

TABLE III

Implied Storage Operation Decode Using Redundant Target Address Register Usage Pitfall Example Code

| a: | vaddfp | v1, v2, v3 | # v1=v2+v3 |
|---|---|---|---|
| b: | vaddfp | v1, v5, v6 | # reinterpreted as a store |
| c: | vaddfp | v1, v5, v6 | # programmer's intent is to |
|  |  |  | #   add the contents of v5 and v6 |
|  |  |  | #   and place the result in v1, |
|  |  |  | #   however this is reinterpreted |
|  |  |  | #   as a store |
| d: | vcmpeqfp. | v7, v1, v2 | # compare the contents of v1 and |
|  |  |  | #   v2. But since the above |
|  |  |  | #   instruction is reinterpreted |
|  |  |  | #   as a store, v1 contains |
|  |  |  | #   contents other than what the |
|  |  |  | #   errant program intended |

Programmers writing software for a system using this embodiment must take care to use an alternate register other than the register most recently used for the implied store if the intent is to actually use that register as a target. Table IV below shows a code listing where instead of using vector register 1 as a target for instruction c, an alternate register, vector register 7 is used. This causes instruction c to not be reinterpreted as a store, but rather as a vector add instruction, which matches the programmer's intent.

TABLE IV

Implied Storage Operation Decode Using Redundant Target Address Pitfall Workaround Example Code

| a: | vaddfp | v1, v2, v3 | # v1=v2+v3 |
|---|---|---|---|
| b: | vaddfp | v1, v5, v6 | # reinterpreted as a store |
| c: | vaddfp | v7, v5, v6 | #   add the contents of v5 and v6 |
|  |  |  | #     and place the result in v7 |
| d: | vcmpeqfp. | v8, v7, v2 | # compare the contents of v1 and |
|  |  |  | #   v2 |

Figure 5:
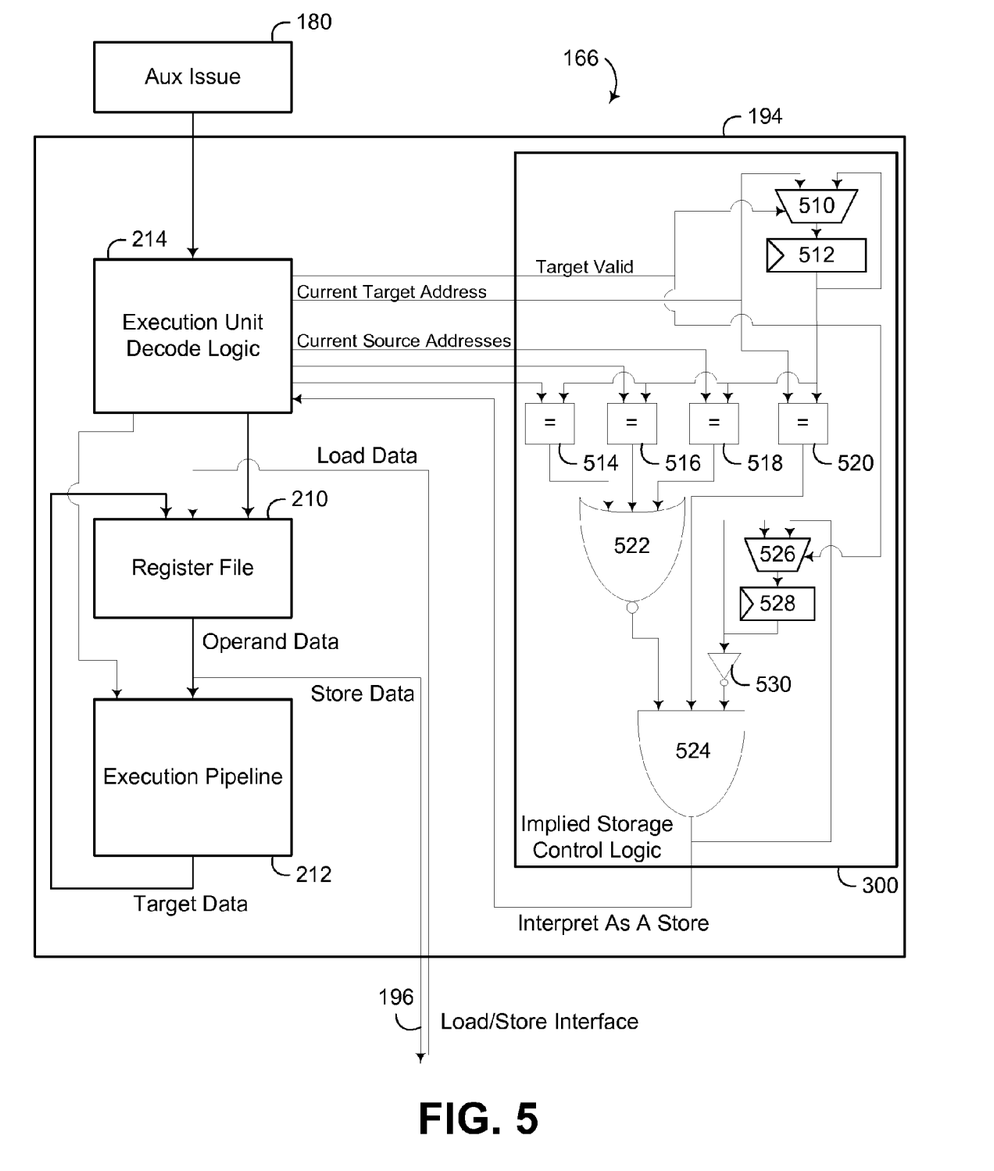
FIG. 5 is a block diagram of a AXU Auxiliary Execution Unit incorporating implied storage operation decode using redundant target address detection consistent with another embodiment of the invention, and capable of being implemented within the processor of FIG. 2.

The workaround method described above and in table IV has potential drawbacks if spare register resource is scarce. FIG. 5 illustrates an alternate embodiment of the invention, where an instruction that uses the same target address as a previous instruction that was reinterpreted as a store is prevented from also being interpreted as a store. This avoids the pitfall described in Table III and does not use additional scratch registers.

FIG. 5 illustrates additional detail of an auxiliary processing unit 166 that implements another embodiment of the invention that is capable of performing implied storage operation decode using redundant target address detection.

Auxiliary execution unit 166 includes an auxiliary instruction dependency/issue logic 180 coupled to execution unit decode logic 214. In the alternative, auxiliary execution unit 166 may be implemented in other processor architectures that issue and execute instructions, including single or multi-core microprocessors or microcontrollers.

Auxiliary instruction dependency/issue logic 180 operates to schedule the issuance of instructions by the various threads, and auxiliary instruction dependency/issue logic 180 typically includes logic for managing dependencies between instructions, in a manner generally understood in the art. Auxiliary instruction dependency/issue logic 180 outputs instructions to execution unit decode logic 214, which causes auxiliary execution unit 166 to initiate execution of received instructions.

Execution unit decode logic 214 receives instructions from auxiliary instruction dependency/issue 180, and decodes the current instruction type, and if the current instruction is of a first instruction type that writes data into register file 210, provides a target address, and a target write valid to implied storage control logic 300. Execution unit decode logic 214 may be configured to decode a target write valid for all instructions sent to auxiliary execution unit 166, or only for a subset of instruction types based upon the instruction opcode. Implied storage control logic 300 is configured to receive the target address associated with the current instruction and provide it as an input to multiplexer 510. Implied storage control logic 300 is also configured to receive the target write valid and provide it as a selector input to multiplexer 510. Multiplexer 510 is coupled to latch 512 and is configured to provide as input to latch 512 either the output of latch 512 if the target write valid is not asserted, or the current target address from execution unit decode logic 214 if the target write valid is asserted. This configuration allows latch 512 to contain the target address of the last instruction that wrote data into register file 210.

The current target address of the current instruction from execution unit decode logic 214 is also provided to address comparator 520. In addition, the last target address from latch 512 is provided to address comparator 520. Address comparator 520 is configured to compare the addresses from latch 512 and execution unit decode logic 214 and provide an indication to AND gate 524 as to whether or not the target address of the current instruction and the target address from the previous instruction that wrote data into register file 210 are equal. Address comparator 520 compares addresses that comprise an address valid bit, such that address comparator 520 only provides an equal indication if both addresses being compared are valid. An example of an invalid target address would be an instruction that is valid but does not write a target value into the register file.

The target address from latch 512 is also provided to address comparators 514, 516, and 518. The source addresses from the current instruction are sent from execution unit decode logic 214 to address comparators 514, 516 and 518. A separate address comparator configured similarly to 514, 516 and 518 must be included in implied storage control logic 300 for each source address supported by the instruction set architecture. Indications from each address comparator 514, 516 and 518 are provided to NOR gate 522. Address comparators 514, 516 and 518 each compare addresses that comprise an address valid bit in each address, such that address comparators 514, 516 and 518 independently provide an equal indication if both addresses being compared by an address comparator are valid. An example of an invalid source address would be an instruction that is valid but does not use one or several sources in the execution of the instruction.

Address comparators 514, 516 and 518 and NOR gate 522 are configured to detect if none of the source addresses in the current instruction utilize the same target as the last instruction that wrote data into register file 210, meaning that the current instruction does not make use of the data in register file 210 at the address specified in latch 512.

NOR gate 522 then provides an indication to AND gate 524 as to whether or not any source addresses from the current instruction are equal to the last target address used to write data into register file 210.

Multiplexer 526 is coupled to latch 528 and is configured to provide as input to latch 528 either the output of latch 528 if the target write valid is not asserted, or the output from AND gate 524 if the target write valid is asserted. This configuration allows latch 528 to contain the logical value of whether or not the last instruction that would have normally written a result into the register file was reinterpreted as a store.

Inverter gate 530 is coupled to latch 528 and is configured to logically invert the output of latch 528 and provide the result to AND gate 524. This prevents the current instruction from being reinterpreted as a store if the last instruction was reinterpreted as a store.

AND gate 524 is configured to accept indications from NOR gate 522, address comparator 520, and inverter gate 530 and provide an indication to execution unit decode logic 214 that a redundant target address write condition has occurred, and that execution unit decode logic 214 should decode the current instruction as a store instruction.

It will be appreciated by those skilled in the relevant art that any logical equivalent combination of NOR gate 522 and AND gate 524 may be substituted and not depart from the scope of the invention. It should also be noted that a separate implied storage control logic 300 must be implemented for each thread in a multithreaded design.

Auxiliary execution unit 166 includes register file 210 coupled to execution pipeline 212. Register file 210 includes an array of registers, each of which are accessed by a unique address. For example, register file 210 may be implemented to support 64 registers, each accessed by a unique 6 bit address. It will be appreciated that different numbers of registers may be supported in different embodiments.

Execution unit decode logic 214, in response to receiving an indication from implied storage control logic 300 that the current instruction should be decoded as a store instruction, provides the target address of the current instruction to register file 210 to be used to read data out of register file 210. Register file 210 reads store data from the location specified by the target address from execution unit decode logic 214 and provides it to load/store bus 196. In addition, execution unit decode logic 214, in response to receiving an indication from implied storage control logic 300 that the current instruction should be decoded as a store instruction, provides source register addresses to load/store interface 196 to be used by Load/Store logic 188 to calculate the effective address for the store instruction.

Execution unit decode logic 214, in response to receiving an indication from implied storage control logic 300 that the current instruction should not be decoded as a store instruction because no redundant target write condition has occurred, provides source register addresses from the current instruction.

Register file 210, in response to receiving source register addresses from execution unit decode logic 214, will read operand data contained in the register file entries associated with the source register addresses and provide the required operand data to the execution pipeline 212.

Execution pipeline 212, in response to operand data received from register file 210, performs mathematical, logical or other operations on one or more source operands retrieved from selected registers in register file 210. For example, execution pipeline 212 receives a source operand from register file 210, and may store a result data back into register file 210, e.g., in the form of a target written to a register in the register file associated with the target address from execution unit decode logic 214.

Execution pipeline 212 may be implemented as a number of different types of execution units, e.g., floating point units, fixed point units, or specialized execution units such as graphics processing units, encryption/decryption units, coprocessors, XML processing units, etc.

Figure 6:
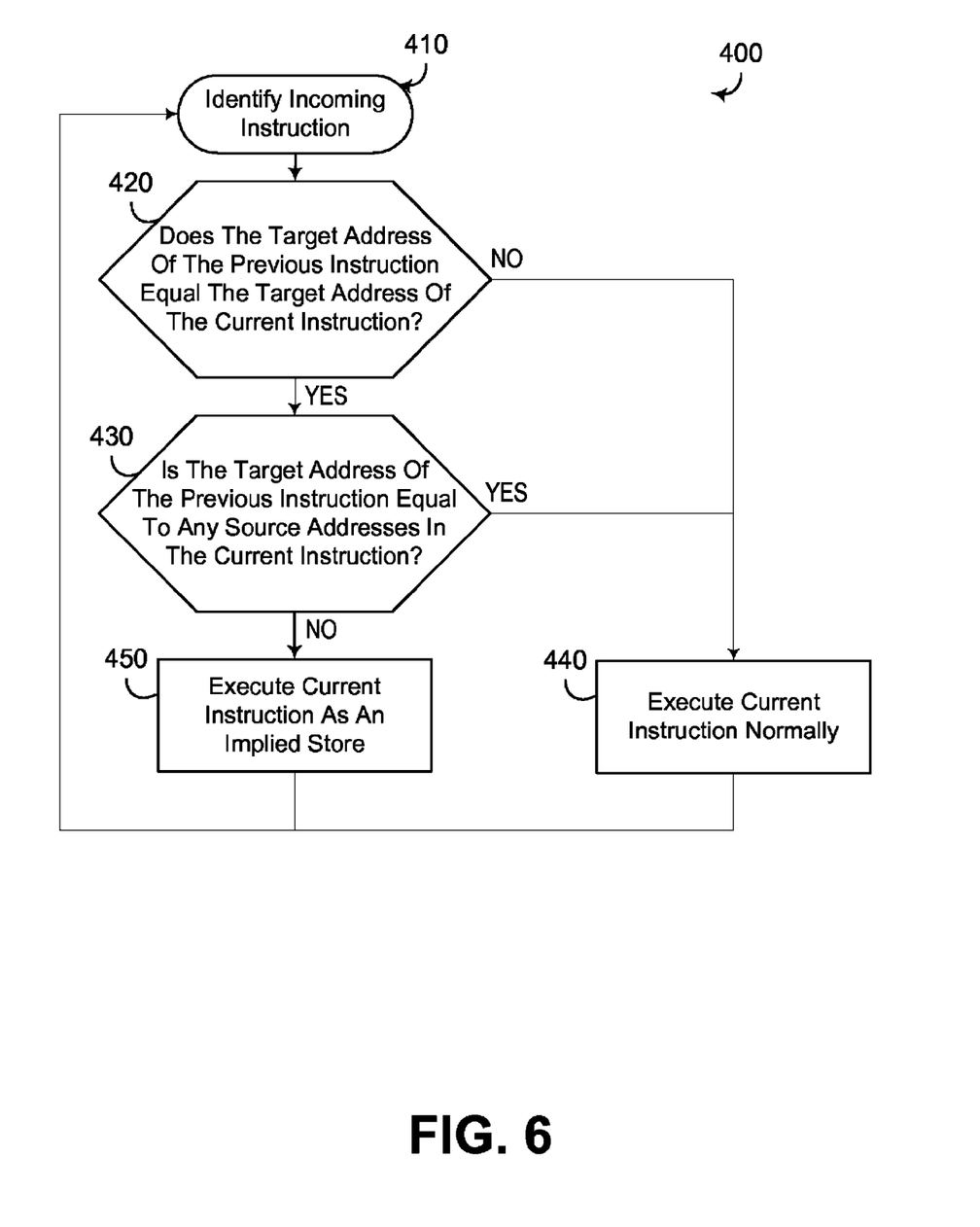
FIG. 6 is a flow chart illustrating an exemplary sequence of operations performed by the AXU Auxiliary Execution Unit of FIG. 3 to implement implied storage operation decode using redundant target address detection consistent with the invention.

FIG. 6 illustrates a method 400 outlining a sequence of operations performed by auxiliary execution unit 166 when processing instructions from an instruction stream, and supporting implied storage operation decode using redundant target address detection consistent with the invention. With this sequence of operations, upon receipt of an incoming instruction, the instruction type is identified in block 410. Control then passes to block 420, where a determination is made as to whether the target address of the previous instruction is equal to the target address of the current instruction. If not, control passes to block 440, where the instruction is executed normally, and control passes back to block 410 to identify the next incoming instruction in the instruction stream.

If a determination is made in block 420 that the target address of the previous instruction is the same as the target address of the current instruction, then control passes to block 430, where a determination is made as to whether the target address of the previous instruction is equal to any of the source addresses in the current instruction. If target address of the previous instruction is equal to any of the source addresses in the current instruction, control passes to block 440, where the instruction is executed normally, and control passes back to block 410 to identify the next incoming instruction in the instruction stream.

If a determination is made in block 430 that the target address of the previous instruction is not equal to any of the source addresses of the current instruction, then control passes to block 450, where the current instruction is executed as a store instruction.

Control then passes back to block 410, where the next instruction in the instruction stream is identified and the method repeats.

Embodiments of the present invention may be implemented within the hardware and software environment described above in FIGS. 1-6. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

It will be appreciated that various additional modifications may be made without departing from the spirit and scope of the invention. For example, implied storage control logic 300 may compare the target addresses from more than one previous instruction.

Other modifications will be apparent to one of ordinary skill in the art having the benefit of the instant disclosure. Therefore, the invention lies in the claims hereinafter appended.

What is claimed is:
1. A computer system, comprising:
a register file addressed by a register address;
an execution unit configured to receive a source operand from the register file and to write a result into the register file; and an implied storage control logic configured to:
make a first comparison of a target register address from a current instruction with a target register address of a preceding instruction;
make a second comparison of the target register address from the preceding instruction
against a source register address of the current instruction; and at runtime of the current instruction;
cause the execution unit to interpret the current instruction as a store instruction if the first comparison is logically true and the second comparison is logically false.

2. The computer system of claim 1, further comprising:
an execution unit decode logic configured to:
decode the current instruction and provide the target register address and at least one source register address to the implied storage control logic.

3. The computer system of claim 2, further comprising a load/store interface configured to accept operand data from the register file.

4. The computer system of claim 3, the execution unit decode logic further configured to:
decode the current instruction and provide to the implied storage control logic an indication of whether or not the current instruction will read a source operand from the register file, and whether or not the current instruction will write a target operand to the register file.

5. The computer system of claim 4, the execution unit decode logic further configured to:
provide the target register address of the current instruction to the register file for reading operand data associated with the target register address and sending that operand data to the load/store interface for storage.

6. The computer system of claim 1, the implied storage control logic comprising:
a first latch configured to store the target address;
a first multiplexer functionally coupled to the input of the first latch and configured to:
provide the output of the first latch to the input of the first latch in response to no target being written to the register file; and
provide the target register address from the current instruction to the input of the first latch in response to a target operand of the current instruction being written into the register file.

7. The computer system of claim 6, the implied storage control logic further comprising:
an address comparator configured to compare the target address of the current instruction with a target address of a previous instruction that wrote a target operand into the register file.

8. The computer system of claim 6, the implied storage control logic further comprising:
an address comparator configured to compare a target address of a previous instruction that wrote a target operand into the register file with the source addresses of the current instruction.

9. The computer system of claim 6, the implied storage control logic further comprising:
a NOR gate configured to indicate a result of logically true when no source addresses of the current instruction match a target register address of a previous instruction that wrote a target operand into the register file.

10. The computer system of claim 6, the implied storage control logic further comprising:
an AND gate configured to indicate a logically true result when no source addresses of the current instruction match a target register address of a previous instruction that wrote a target operand into the register file, and the target address of the current instruction matches the target register address of the previous instruction that wrote a target operand into the register file.

11. The computer system of claim 6, the implied storage control logic further comprising:
a second latch configured to store the output of the AND gate;
an inverter gate functionally coupled to the AND gate at its input and configured to invert the output of the second latch and provide a result to the AND gate;
a second multiplexer functionally coupled to the input of the second latch and configured to:
provide the output of the second latch to the input of the second latch in response to no target being written to the register file; and
provide the output of the AND gate to the input of the second latch in response to a target operand of the current instruction being written into the register file.

12. The computer system of claim 1, further comprising:
a load/store interface configured to, in response to the implied storage control logic interpreting the current instruction as a store instruction, communicate data from the register file to memory.

13. The computer system of claim 12, the execution unit further configured to provide data from the current instruction to the load/store interface suitable for calculating an effective address in response to the second instruction being interpreted as a store instruction.

14. The computer system of claim 12, the execution unit further configured to provide the source addresses of the current instruction to the load/store interface for calculating the effective address in response to the second instruction being interpreted as a store instruction.

15. The computer system of claim 12, the execution unit further configured, in response to the second instruction being interpreted as a store instruction, providing the target address of the current instruction to the register file, reading the operand data associated with that target register address from the register file, and providing it to the load/store interface for storage.

16. A method of executing instructions from an instruction set, the method comprising: receiving a first instruction;
storing a first target register address associated with the first instruction;
receiving a second instruction;
comparing a second target register address associated with the second instruction with the first target register address associated with the first instruction;
comparing the first target register address associated with the first instruction with all source addresses associated with the second instruction; and
at runtime of the second instruction in response to determining that the first target register address matches the second target register address and does not match any of the source addresses associated with the second instruction:
reinterpreting the second instruction as a store instruction.

17. The method of claim 16, the method further comprising, in response to receiving the first instruction:
performing a decode of the first instruction based upon the first opcode associated therewith; and in response to receiving the second instruction: performing a decode of the second instruction based upon a second opcode associated therewith.

18. The method of claim 17, the method further comprising: selectively reinterpreting the second instruction as a store instruction in response to determining that the first opcode associated with the first instruction matches a first instruction type.

19. The method of claim 17, the method further comprising:
using the second target register address to read operand data associated with that second target register address and storing the operand data in response to the second instruction being interpreted as a store instruction.

20. The method of claim 16, the method further comprising, in response to reinterpreting the second instruction as a store instruction:
Disabling reinterpretation of a following instruction as a store instruction.

* * * * *